May 20, 1969　　　H. GAWLICK ET AL　　　3,444,812
CARTRIDGE
Filed Dec. 23, 1966

INVENTORS
HEINZ GAWLICK
RUDOLF STAHLMANN
HANS UMBACH

BY　*Dicke + Craig*

ATTORNEYS 3,444,812
CARTRIDGE
Heinz Gawlick and Rudolf Stahlmann, Furth, and Hans Umbach, Stadeln, Germany, assignors to Dynamit Nobel Aktiengesellschaft, Troisdorf, Germany
Filed Dec. 23, 1966, Ser. No. 604,329
Int. Cl. F42b 5/20
U.S. Cl. 102—39   3 Claims

ABSTRACT OF THE DISCLOSURE

The present invention relates to a cartridge, particularly a propellant cartridge used in commercial implements, for example, cattle stunning apparatus and bolt setting or driving equipment. The cartridge case is inserted into an annular channel in the bottom piece with a force fit. The width of the channel is at least 2% smaller than the inserted wall thickness of the cartridge case. Preferably, the inside diameter of the channel is at least 2% larger than the inside diameter of the cartridge case so that the cartridge case expands during the force fit and the inside channel wall is tapered to form a cam surface to facilitate the assembly. Additionally, an even tighter fit is obtained with either a plurality of spaced deformations or a single annular deformation of the outside channel wall into the cartridge case wall. Specifically, particular advantages are obtained with a synthetic polymer cylindrical cartridge case and a metallic bottom piece.

Background of the invention

Different known types of ammunition, for example, blank cartridges, have a thrermoplastic cartridge case and a metallic bottom piece having interengaging portions, for example, an annular groove in one and a plurality of projections or shoulder portions in the other. The bottom piece and cartridge case are usually pressed together so that the projections can pass the annular grooves and snap into the annular grooves in a form-locking manner. Such a prior art construction will not separate under the relatively great gas pressures that arise when the cartridge is fired. However, this prior art type of cartridge is relatively expensive and complicated to manufacture, even in large quantities. Therefore, this prior art type of cartridge is not completely satisfactory when used with commercial implements, for example, cattle stunning devices and bolt setting or stud driving tools.

Brief description of the disclosure

It is an object of the present invention to produce a cartridge, particularly a propellant cartridge for use in commercial devices as mentioned above, that will not separate under the extreme pressures encountered during firing and that is relatively inexpensive and simple to manufacture. The cartridge of the present invention is constructed with a synthetic polymer cartridge case, preferably a thermoplastic material, for example, polyvinyl chloride. Broadly, the bottom piece may be constructed of either metal, for example, aluminum, or from a synthetic polymer, preferably the same synthetic polymer that is used in the construction of the cartridge case. Preferably, the above-mentioned channel and cartridge case are cylindrical.

The manufacture of the present cartridge is particularly simple in that the particular forms are all smooth walled and do not employ any complicated projections that would be difficult to mold, particularly when the bottom piece is also constructed of a synthetic polymer. When portions of the channel outer wall are deformed inwardly into the cartridge case, the deformations may be accomplished immediately after the force fit assembly in the same apparatus on an assembly line basis. It is particularly desirable that the inside wall of the channel is extended axially beyond the outside wall and tapered inwardly to provide a came surface for elastically spreading the cartridge case during the force fit assembly so that the cartridge case will be moved into a tight clamping relationship with the outer wall of the channel and elastically grip the inner, more rigid wall of the bottom piece channel. Also, this cam-like extension facilitates the assembly of this cartridge.

Further objects, features, modifications and variations of the present invention will become more clear from the following description of a preferred embodiment.

Detailed description of the drawing

Figure 1:
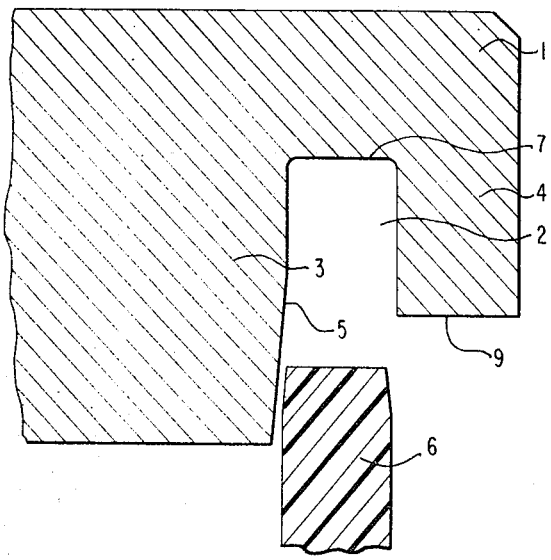
FIGURE 1 is a partial cross-sectional view through the axis of a cartridge constructed according to the present invention immediately before the cartridge case is pressed into the channel of the bottom piece.

According to FIGURE 1, the bottom piece 1 is provided with an annular channel 2 that opens axially toward the opposite end of the cartridge. The inner portion 3 of the bottom piece 1 defines the inner wall of the channel 2 and is axially extended beyond the outer wall 4 of the channel 2; this extension is conically tapered inwardly toward the opposite end of the cartridge. Preferably, the channel 2 and bottom piece 1 are cylindrical.

The cartridge also includes a generally tubular cartridge case 6; preferably, the cartridge case 6 is cylindrical, of uniform wall thickness and of uniform diameter at its lower portion that is inserted into the channel 2. It is a particularly advantageous specific feature of the present invention that the inside diameter of the cartridge case 6 is slightly larger than the free end smallest diameter of the conical extension 5 and substantially smaller than the inside diameter of the annular channel 2 immediately adjacent the bottom 7 thereof. Also, particularly advantageous results are obtained when the width or transverse dimension of the annular channel 2 is substantially smaller than the wall thickness of the cartridge case 6; most preferably, at least 2% smaller.

When the cartridge case 6 is moved axially toward the bottom piece 1, from its position in FIGURE 1, into its assembled relationship, the cartridge case 6 is first elastically expanded outwardly by the cam wall surface 5 into engagement with the outer wall 4 of the channel 2; thereafter, the wall of the cartridge case 6 is compressed as it is forced into the substantially smaller annular channel 2 to provide a tight seal and joint that will not separate during firing of the cartridge. Although this construction in itself will produce a highly satisfactory cartridge case that is also simple and economincal to manufacture, the joint may be made even stronger by deforming or striking portions of the outer wall 4 into the cartridge case 6 after the cartridge 6 and bottom piece 1 have been assembled with their force fit.

Figure 2:
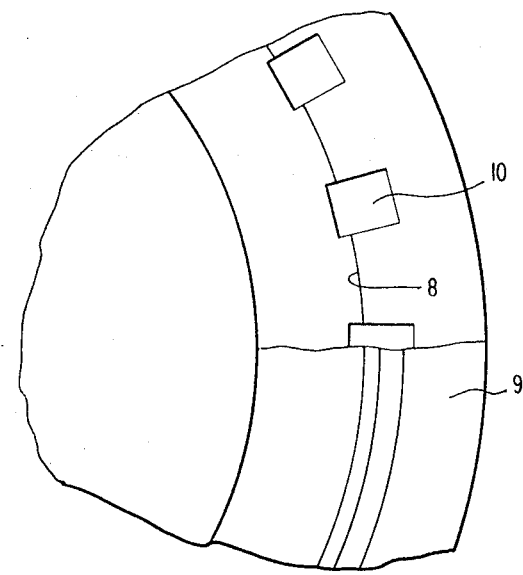
FIGURE 2 is a partial view from the top of the assembled cartridge looking axially toward the bottom piece to schematically show the deformations or deformed projections.

FIGURE 2 somewhat schematically shows two embodiments of deformed projections that may be employed to make the force fit joint even stronger, as mentioned above. After the bottom piece 1 and the cartridge case 6 have been assembled with their force fit, a suitable tool is struck into the material of the bottom piece through the end surface 9 of the outer wall 4 to force portions of the outer wall permanently inwardly beyond the wall surface 8 of the channel 2; these deformed portions or projections will permanently extend into the wall of the cartridge case 6 to produce a form-locking engagement. These deformations may take the form of a plurality of peripherally spaced deformations 10, which are known per se in other environments or a single annular deformation as only schematically shown in the bottom portion of FIGURE 2. It is to be understood that FIGURE 2 shows two embodiments to simplify the disclosure.

Further modifications, embodiments, and variations of the above described preferred embodiments are contemplated to fall within the spirit and scope of the present invention as defined by the following claims.

We claim:

1. A cartridge, comprising: a generally tubular cartridge case of a synthetic polymer and having an axis; bottom piece means for substantially closing one axial end of said cartridge case; said bottom piece means having an annular cylindrical channel opening toward the other end of the said cartridge case and telescopically receiving the one end of said cartridge case with a force fit; said one end of said cartridge case being cylindrical; the channel dimensions, transverse to said axis, being at least 2 percent smaller than the corresponding telescoped case wall dimension, transverse to said axis, when said bottom piece means and said cartridge case are in their unstressed conditions prior to assembly; the inside diameter of said channel being at least 2 percent larger than the inside diameter of the corresponding portion of said cartridge case one end, in their unstressed conditions prior to assembly; said bottom piece means having a cylindrical central projection having a first cylindrical walled portion forming the inside wall of said channel and another portion integral with said first portion axially extending beyond the outer wall of said channel; said another portion having one axial end directly integrally connected to said first portion with an outside diameter at least 2 percent larger than the inside diameter of said cartridge case one end, an opposite axial end with an outside diameter substantially smaller than the inside diameter of said cartridge case one end, and an annular cam surface between said ends that is tapered inwardly toward the other axial end of said cartridge case, in its unstressed condition to assembly.

2. The cartridge according to claim 1, wherein said bottom piece means is metallic; and said bottom piece has an annular portion enclosing said cartridge case forming the outside wall of said channel, which annular portion has a plurality of peripherally spaced inwardly deformed projections extending into said cartridge case.

3. The cartridge according to claim 1, wherein said bottom piece means is metallic; and said bottom piece means has an annular portion enclosing said case forming the outside wall of said channel, which annular portion has an annular deformed projection extending into said case.

References Cited

UNITED STATES PATENTS

| 1,292,359 | 1/1919 | Nelson | 102—44 |
| 2,654,319 | 10/1953 | Roske | 102—43 |
| 3,099,958 | 8/1963 | Daubenspeck et al. | 102—42 |
| 3,105,439 | 10/1963 | Young | 102—43 |
| 3,207,074 | 9/1965 | Kinna et al. | 102—44 |
| 3,283,718 | 11/1966 | Stradler et al. | 102—44 X |

SAMUEL W. ENGLE, *Primary Examiner.*

U.S. Cl. X.R.

102—44